(12) United States Patent
Hoetger et al.

(10) Patent No.: US 7,464,550 B2
(45) Date of Patent: Dec. 16, 2008

(54) VEHICLE WITH COMBUSTION ENGINE AND AUXILIARY POWER UNIT

(75) Inventors: Michael Hoetger, Berlin (DE); Detlef Wüsthoff, Berlin (DE); Herbert Clemens, Berlin (DE)

(73) Assignee: Amovis GmbH, Berlin (DE)

( * ) Notice: Subject to any disclaimer, the term of this patent is extended or adjusted under 35 U.S.C. 154(b) by 660 days.

(21) Appl. No.: 10/993,759

(22) Filed: Nov. 19, 2004

(65) Prior Publication Data

US 2005/0167173 A1   Aug. 4, 2005

(30) Foreign Application Priority Data

Nov. 20, 2003   (DE) ................... 103 54 368

(51) Int. Cl.
   *F02G 3/00* (2006.01)
(52) U.S. Cl. .......................... 60/616; 60/517
(58) Field of Classification Search ........... 60/614–618, 60/517, 670
   See application file for complete search history.

(56) References Cited

U.S. PATENT DOCUMENTS 3,180,078 A * 4/1965 Liston ..................... 60/280
5,000,003 A * 3/1991 Wicks ..................... 60/618
5,018,354 A * 5/1991 Melchior et al. ........... 60/606
5,522,723 A   6/1996 Durst et al.
6,508,060 B2  1/2003 Clemens et al.
6,793,693 B1 * 9/2004 Koehne et al. ............. 44/300
6,872,481 B2 * 3/2005 Matos da Silva et al. .... 429/17
2002/0071098 A1  6/2002 Otten, III
2002/0194848 A1 12/2002 Clemens et al.
2004/0065078 A1  4/2004 Schafer-Sindlinger et al.

FOREIGN PATENT DOCUMENTS

DE    3434532       2/1986
DE    20110553 U1  11/2001
DE    10139526      2/2003
DE    10228411      9/2003
DE    10240234      3/2004
GB    2313623       3/1997
WO    WO 0006948    2/2000

* cited by examiner

*Primary Examiner*—Hoang M Nguyen
(74) *Attorney, Agent, or Firm*—Thorpe North & Western LLP

(57) ABSTRACT

Motor vehicle comprises a combustion engine with internal combustion of fuel and/or cold-flame product for driving the motor vehicle and thereby producing exhaust gas and an auxiliary power unit comprising an external burner and an expansion machine. A fuel tank with fuel provides energy to the burner and the combustion engine. The motor vehicle has a cold-flame-reactor with means for feeding the fuel from the fuel tank to the cold-flame reactor, and at least a portion of the fuel is pre-combusted to a cold-flame product in the cold-flame reactor.

16 Claims, 2 Drawing Sheets

VEHICLE WITH COMBUSTION ENGINE AND AUXILIARY POWER UNIT

TECHNICAL FIELD

The invention relates to a motor vehicle comprising:
(a) a combustion engine with internal combustion of fuel and/or cold-flame product for driving the motor vehicle and thereby producing exhaust gas and
(b) an auxiliary power unit comprising an external burner and an expansion machine, and
(c) a fuel tank with fuel for providing energy to the burner and the combustion engine.

Examples for such a combustion engine with internal combustion are, for example, an Otto engine or a Diesel engine. These are different to machines with external combustion, such as a steam engine or a stirling engine. Fuel is, for example, leaded or unleaded gasoline of various octane numbers, diesel oil, fuels from organic resources or the like, which are readily commercially available.

In an Otto engine a mixture of fuel and air is fed to the combustion chamber of a cylinder. There, it is compressed and ignited by means of a spark plug. The mixture of fuel and air is combusted. Thereby the pressure is increased and the piston is moved downwards. With such a process the thermal energy of the combustion process is converted to mechanical power. A Diesel engine also operates with internal combustion. However, it does not require a spark plug for ignition the mixture of fuel and air, but is based on self-ignition of the fuel injected into the highly compressed air.

The ignition process occurs at one point in the internal combustion of an Otto engine. The combustion starts at the spark plug. Thereby a flame front is generated, then propagating into the combustion chamber. Engine knocking is the term for unwanted local self-ignition. The fuel-air-mixture in the combustion chamber ignites in one or more points and generates a pressure wave (explosion) which may harm the piston. In engines with self-ignition (Diesel engines) the combustion starts at different points in the combustion chamber. Here an uneven flame front is formed also.

During propagation of the flame front within the combustion chamber, high temperatures and pressure gradients are generated. These lead to high pollutant concentrations in the exhaust gas generated by the engine. Soot, hydrocarbons (HC) due to uncomplete combustion and carbon monoxide (CO) are generated at points with low temperature which have not yet been reached by the flame front. Unwanted nitrogen oxide ($NO_x$) is generated at particularly hot points. For reducing the soot portion of the pollutant emissions expensive soot filters must be used. It is desired to reduce the pollutant emissions.

A steam cycle comprises an external burner, a steam generator and an expansion machine. A working medium, such as, for example, water steam, is, at first, evaporated in the steam generator of such a steam cycle by the hot gases from the burner. The highly pressurized, hot, evaporated working medium is expanded in the expansion machine generating mechanical power. The expansion machine is, for example a reciprocating piston engine or a rotational piston engine. Here also exhaust gas is generated which only has only very low pollutant emissions due to the continuous combustion.

PRIOR ART

The use of an additional auxiliary power unit for the generation of heat and electrical power or as an additional driving unit are generally known. Particularly for large motor vehicles the situation occurs where more electrical power is needed than a conventional dynamo, which is coupled to the shaft of the driving motor can provide. It may also be desirable, for example for trucks, to provide an auxiliary power unit which can provide heat and electrical power while the driving motor is not running.

It is known to use the exhaust gas of a driving motor for the generation of steam of a steam cycle used in an auxiliary power unit. It is, however, necessary that the driving motor runs for this purpose, which is not always desired.

Furthermore, it is known to reduce the pollutant emissions of exhaust gas by providing the steam cycle process with a burner which emits only small amounts of pollutant emissions. Such a burner is, for example, a porous burner as described in the U.S. Pat. No. 5,522,732 (Durst) in the DE 102 28 411 or a surface radiant burner emitting only small amounts of pollutant.

From US 2004/0065078 A1 it is known to reduce the pollutant emissions of a combustion engine by after-burning its exhaust gases in an additional combustion process outside the engine.

The term "HCCI" (Homogenous Charge Compression Ignition) denotes a combustion engine where a mixture of air, fuel and recycled exhaust gas is compressed until self-ignition occurs. With a suitable composition of the fuel-air-mixture the emission of pollutant emissions is reduced.

A cold-flamer-reactor and the process called "cold flame" is described in great detail in WO 00/06948 the contents of it are incorporated here by reference. A cold-flame-reactor is understood as a reactor enabling a fuel to contact an oxidator in a reaction chamber at a pressure $p \geq 1$ bar. The oxidator is heated to a temperature of at least 520 K to 880K. Alternatively the fuel is contacted at a lower pressure with the oxidator at lower temperature. The molar C/O-ratio is between 1:0,14 to 1:25. The contact is established in such a way, that exothermal pre-reactions in the form of a cold flame are initiated. The pre-reactions cause only a partial reaction of the fuel and the oxidatior even for homogenous mixture of the fuel and the oxidator. Furthermore the reactor causes a kinetic reaction delay of the further reaction of the oxidizing mixture generated by the cold flame. Thereby self-ignition of the mixture is prevented especially for a foreseeable time. This delay is effected by adjusting the technically relevant residence time $t_v$ of the mixture in the reaction chamber to a value of $t_v > 25$ ms at a pressure of $p \leq 1$ bar. Residence times which are smaller under the same conditions when the pressure is increased are also possible. Furthermore the heat dissipation from the reaction zone through an inert gas flow is effected. The ratio between the heat capacity flow $\dot{M} \cdot c_p$ of the oxidator and the product of the fuel mass flow $M_b$ and the thermal value $H_u$, is adjusted to $\dot{M} \cdot c_p / M_b \cdot H_u > 2 \cdot 10^{-4}$ $K^{-1}$ in an adiabatic reaction chamber. Furthermore the reactor wall can have a thermal flow density $\dot{q}$ which is $\dot{q} < 85$ $kW/m^2$ for this purpose.

The cold flame reaction is a product generated without self-ignition in a, for example, understoichiometric combustion process. The cold-flame product is heated up in the pretreatment process and obtains a very high degree of homogenity. The combustion in the combustion chamber generates considerably less pollutant emissions.

DISCLOSURE OF THE INVENTION

It is an object of the invention to provide a motor vehicle with a combustion engine for driving the vehicle and with a thermal combustion engine for operating an auxiliary power unit with reduced overall soot and pollutant emissions.

According to an aspect of he invention this object is achieved by a motor vehicle wherein a cold-flame-reactor is provided with means for feeding fuel from a fuel tank to the cold-flame-reactor, and wherein at least a portion of the fuel is pre-combusted to a cold-flame product in the cold-flame-reactor. The cold-flame product is generated in a process as described above and in the WO 00/06948. Surprisingly it was found that the addition of cold-flame product to a combustion process combusting fuel and air reduces the pollutant emission. This is particularly relevant to the emissions of soot, uncombusted hydrocarbons (UHC), carbon monoxide (CO) and nitrogen oxide ($NO_x$). Only a small amount of cold-flame product is sufficient to achieve a significant reduction of the pollutant emission.

The cold flame reactor is particularly advantageous if the combustion engine is directly fed with fuel from the fuel tank and with cold-flame product and the burner of the auxiliary power unit is only fed with cold-flame product. The reduction of the pollutant emissions is achieved in the combustion engines with internal combustion as well as in the auxiliary power unit.

In an alternative embodiment of the invention the combustion engine is exclusively fed with fuel from the fuel tank and the burner of the auxiliary power unit is exclusively fed with cold-flame product. In this embodiment the pollutant emissions of the auxiliary power unit are reduced which is advantageous for the modus, where the combustion engine is not operated (standing-vehicle). This embodiment is particularly suitable for the further development or retrofitting of existing driving engines. The existing engine must not be changed. Only the additional auxiliary power unit is operated with pre-treated fuel-mixture.

In a further alternative embodiment of the invention the combustion engine and the burner of the auxiliary power unit are exclusively fed with cold-flame product. In this case the combustion engine and the burner of the auxiliary power unit are not fed with fuel, but only cold-flame-product. The combustion engine is adequately adapted to the requirements of the new fuel-mixture.

In a particularly preferred embodiment of the invention the burner of the auxiliary power unit is fed at least with a portion of the exhaust gas of the combustion engine. In this arrangement the exhaust gas is after-burnt in the burner of the auxiliary power unit which has a particularly low pollutant level. In order to ensure that the gas is combustible in the low pollutant burner it is mixed with the cold-flame product in a suitable ratio. The required burner capacity is taken into account. Thereby, the emission of pollutants are further reduced. Uncombusted hydrocarbons and soot provide further energy resources. Contrary to the requirements in setups without a burner, where the use of thermal energy by the thermal engine of the auxiliary power unit is exclusively generated by the exhaust gas of a combustion engine, the present auxiliary power unit may operate without the driving engine, i.e. when the vehicle is standing.

In a particularly preferred embodiment of the invention, the burner of the auxiliary power unit is a porous burner or a surface radiant burner. Such burner have particularly low pollutant emissions and can be adapted to very many different fluid or gaseous fuels, by suitable designing. Using a cold-flame reactor different liquid fuels may also be used.

For a further reduction of the pollutant emissions a catalyst can be provided for the treatment of the exhaust gas of the combustion engine and/or the auxiliary power unit. This is advantageous especially in the case, where not the entire flow of exhaust gas of the combustion engine is lead through the burner of the auxiliary power unit. A catalyst for the exhaust gas of the burner, however, is generally not necessary if a burner with low pollutant emissions is used.

In a further modification of the invention means are provided for feeding said combustion engine with cold-flame product additionally to a mixture of air and fuel from said fuel tank said mixture being generated before entering the combustion engine. Engines operating with a mixture of fuel and air are called HCCI-engines. Such engines already have a low level of pollutant emissions. However, by adding cold-flame product the power range can be increased. As the cold-flame reactor may be used for the auxiliary power unit anyway, it provides an excellent opportunity to extend the power range of the HCCI-engine without needing further components.

The combustion engine can have two operating modes, one of the operating modes comprising the combustion of cold-flame product and the other mode comprising the combustion of fuel from the fuel tank or a air-fuel-mixture. Means are provided for switching between these operating modes.

The portion of the cold-flame product can be less than 30% of the entire fuel fed to the combustion engine. A significant reduction of the pollutant emissions is still achieved and the cold-flame reactor may be designed with a small size.

The invention is particularly advantageous, if the combustion engine is a diesel engine and the portion of said cold-flame product is less than 5% of the entire fuel fed to the diesel engine.

Further modifications are subject matter of the subclaims. Preferred embodiments of the invention are described below in greater detail with reference to the accompanying drawings. It is understood, however, that these embodiments describe examples only and shall not limit the scope of the invention, which is limited only by the claims.

DESCRIPTION OF PREFERRED EMBODIMENTS

Figure 1:
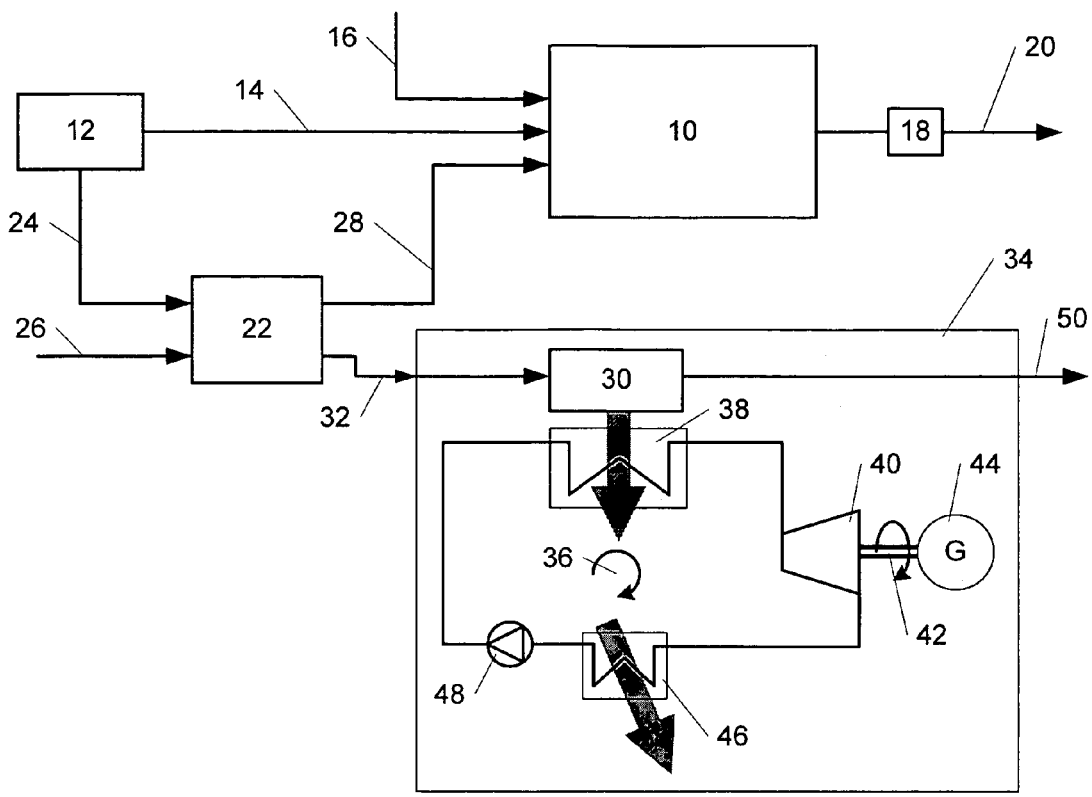
FIG. 1 is a schematic diagram of an assembly with a combustion engine which is fed with fuel and cold-flame product and an auxiliary power unit which is fed with cold-flame product only.

In FIG. 1 numeral 10 denotes a combustion engine for driving a vehicle, such as a truck or a car. The fuel for the combustion engine is in a tank 12. The combustion engine 10 operates according to the HCCI principle, described above. The combustion engine comprises a cylinder with a combustion chamber. An air-fuel-mixture is inserted into the combustion chamber in a known way. This is represented by arrows 14 and 16. The air-fuel-mixture is compressed until it ignites. In such a way a particularly homogenous reaction is achieved. In this mode of operation the combustion engine generates exhaust gas with only a moderate amount of pollutants. The exhaust gas is further treated in a catalyst 18 to reduce the amount of pollutants before it is released to the environment. This is represented by an arrow 20.

Additionally to the air-fuel-mixture, cold-flame product is fed to the combustion engine. A cold-flame reactor 22 is provided for this purpose. The cold-flame reactor operates as it is described above in great detail and further in WO 00/06948 which is incorporated herein by reference. The liquid fuel from the tank 12 is lead to the reactor 22 and serves as a basis for the cold-flame product. This is indicated by an arrow 24. Furthermore, air is fed to the reactor 22. This is indicated by an arrow 26. The cold-flame product generated in an under-stoichiometric reaction is added to the air-fuel-mixture which is used for the combustion engine. This is indicated by an arrow 28. By adding cold-flame product the amount of pollutant emissions of the combustion engine are considerably reduced.

Furthermore, the cold-flame product is fed to a porous burner 30. This is indicated by an arrow 32. The porous burner is part of an auxiliary power unit generally denoted with numeral 34. The auxiliary power unit generates electricity for the board network of the vehicle. Depending on the design of the vehicle heat or mechanical power may also be provided in addition to the electricity. The auxiliary power unit 34 is based on a Clausius-Rankine-steam cycle 36.

A working medium, for example water, is evaporated in a heat exchanger 38 in the steam cycle 36. For this purpose the heat exchanger 38 is exposed to hot gas generated in the porous burner 30. The working medium pumped through the heat exchanger 38 and evaporated therein has a very high pressure. The working medium is expanded in an expander 40, for example an axial piston expander. Mechanical power is performed on a shaft 42 thereby. The shaft 42 drives a generator 44. This generator produces electrical power which is fed to a board network (not shown) of the vehicle.

The expanded working medium is condensed in a condenser 46. The heat released therein may be also used in the vehicle if needed. The condensed working medium is then available again in the cycle and it is pumped to the heat exchanger 38 by a pump 48.

The porous burner used in this embodiment is described in great detail in the U.S. Pat. No. 5,522,723 (Durst). The porous burner comprises a housing filled with porous material. The porous material is distributed to two or three zones with different porosity. The porous material consists of heat-resistant plastic foam, ceramics, metals or metal alloys. The influence of the different porosities of the materials on the combustion behavior is represented by the Péclet-number. This number represents the ration of the heat transfer due to transport of heat due to conductivity. The porosity of the described assembly is such that the zone on the inlet side has a Péclet-number in the range of 40 and the zone on the outlet side has a Péclet-number of about 90. A flame will not form in the zone with the finer pores on the inlet side. The combustion area is established on the well defined border zone between both zones.

The burner operates at low, constant combustion temperatures once it is switched on and provides, therefore, extremely low levels of pollutant emissions. Furthermore, it is suitable for a large variety of fuels. The burner has a large thermal capacity and allows for high combustion velocities causing a high efficiency.

The exhaust gas of the porous burner having extremely low pollutant emissions is released to the environment by the auxiliary power unit 34 (Equal Zero Emission Engine). This is indicated by an arrow 50. By combination of the driving engine with low pollutant emissions and the auxiliary power unit with also low levels of pollutant emissions the entire vehicle has a very small level of pollutant emissions in this design.

Figure 2:
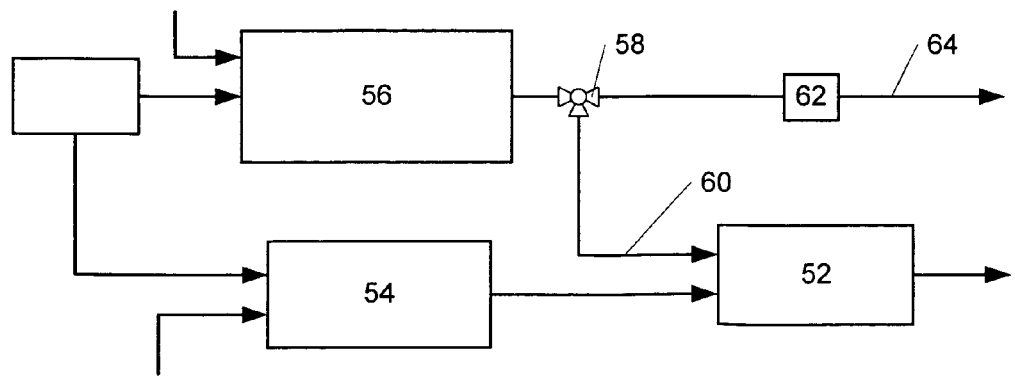
FIG. 2 is a schematic diagram of an assembly with a diesel engine generating exhaust gas which is lead -to a burner of an auxiliary power unit where it is combusted together with cold-flame product.

A further embodiment is shown in FIG. 2. Similar to the embodiment of FIG. 1 an auxiliary power unit 52 is provided. The auxiliary power unit 52 is designed in the same way as the auxiliary power unit 34 of FIG. 1 and, therefore, does not need to be described again. The auxiliary power unit 52 is operated with cold-flame product from a cold-flame reactor 54 as described in FIG. 1, too.

In this embodiment a conventional diesel engine serves as a driving engine 56 in this embodiment. This engine normally has a comparatively high pollutant emission. For the reduction of the pollutant emissions in the exhaust gas the exhaust gas is at least partially lead to through the porous burner of the auxiliary power unit 52. This is indicated by an arrow 60. A control valve 58 is provided for this purpose. The exhaust gas is after-burnt in the porous burner to reduce the amount of pollutant emissions. The uncombusted hydrocarbons and soot contained in the exhaust gas additionally provides a further energy resource in the after-burning. Exhaust gas which is not lead through the porous burner of the auxiliary power unit 52 is treated by a catalyst before it is released to the environment. This is indicated by an arrow 64.

Figure 3:
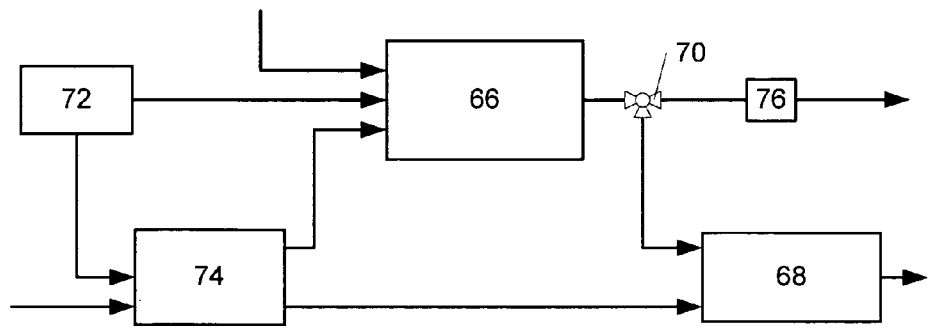
FIG. 3 is a schematic diagram of the assembly of FIG. 1 where the exhaust gas of the combustion engine is combusted with cold-flame product in the burner of an auxiliary power unit.

In FIG. 3 an embodiment similar to the embodiment described in FIG. 1 is shown. The exhaust gas of the driving engine 66, which has already a low level of pollutants is lead to the porous burner of the auxiliary power unit 68. A control valve 70 is provided for this purpose. As it is the case in FIG. 1 the engine 66 is fed with fuel from the tank 72 and with cold-flame product from the cold-flame reactor 74. The porous burner only operates with cold-flame product. Exhaust gas which is not after-burnt is released to the environment after treatment in a catalyst 76.

Figure 4:
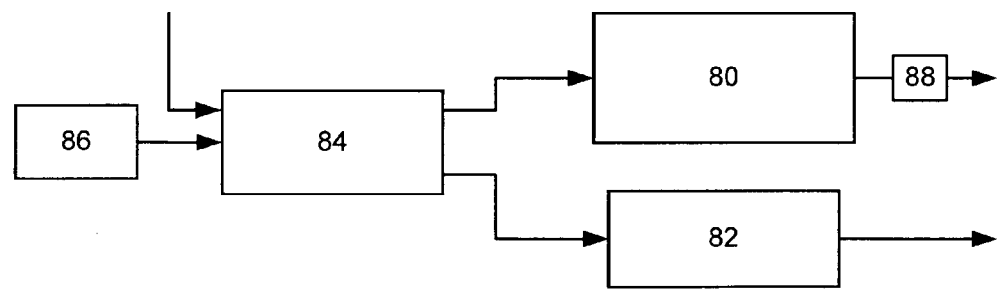
FIG. 4 is a schematic diagram of an assembly with a combustion engine and an auxiliary power unit which are exclusively fed with cold-flame product.
Figure 5:
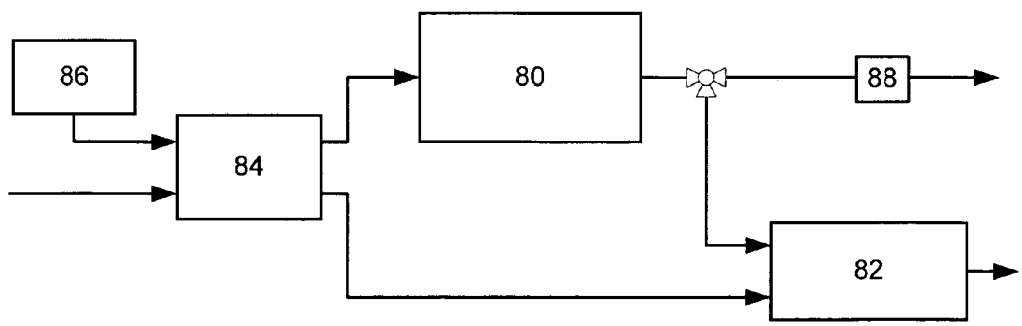
FIG. 5 is a schematic diagram of the assembly of FIG. 4 where the exhaust gas generated in the combustion engine is combusted with cold-flame product in the burner of an auxiliary power unit.

A further embodiment is shown in FIG. 4, where both, the combustion engine 80 and the auxiliary power unit 82 are exclusively operated with cold-flame product. The fuel is entirely fed to the cold-flame reactor from the tank 86. It is provided to drive the driving engine, for example a HCCI-Technology based engine and the auxiliary power unit. As described above the exhaust gas is released to the environment after treatment in a catalyst 88. The exhaust gas can partially be after-burnt in the burner of the auxiliary power unit 82. This is schematically shown in FIG. 5.

The embodiments described above show that a large variety of different driving engines may be used in combination with this invention. Instead of a Clausius-Rankine-steam cycle any other steam cycle or stirling process is possible also, as long as they operate with a burner with low pollutant emissions. The embodiments, however, only illustrate the invention and to not limit the scope of the invention as set forth in the accompanying claims.

We claim:

1. Motor vehicle comprising
   (a) a combustion engine with internal combustion of fuel and/or cold-flame product for driving the motor vehicle and thereby producing exhaust gas and
   (b) an auxiliary power unit comprising an external burner and a piston expansion machine, and
   (c) a fuel tank with fuel for providing energy to the burner and the combustion engine. wherein
   (d) a cold-flame-reactor is provided with means for feeding said fuel from said fuel tank to said cold-flame reactor, and wherein at least a portion of said fuel is pre-combusted to a cold-flame product in said cold-flame reactor.

2. Motor vehicle as claimed in claim 1, wherein said combustion engine is directly fed with fuel from said fuel tank and with cold-flame product and said burner of said auxiliary power unit is only fed with cold-flame product.

3. Motor vehicle as claimed in claim 1, wherein said combustion engine is exclusively fed with fuel from said fuel tank and said burner of said auxiliary power unit is exclusively fed with cold-flame product.

4. Motor vehicle as claimed in claim 1, wherein said combustion engine and said burner of said auxiliary power unit are exclusively fed with cold-flame product.

5. Motor vehicle as claimed in claim 1, wherein said burner of said auxiliary power unit is fed with at least a portion of said exhaust gas from said combustion engine instead of air.

6. Motor vehicle as claimed in claim 1, wherein a catalyst is provided for the treatment of said exhaust gas of said combustion engine and/or said auxiliary power unit.

7. Motor vehicle as claimed in claim 1, wherein means are provided for feeding said combustion engine with cold-flame product additionally to a mixture of air and fuel from said fuel tank said mixture being generated before entering the combustion engine.

8. Motor vehicle as claimed in claim 7, wherein said combustion engine has two operating modes, one of said operating modes comprises the combustion of cold-flame product and the other mode comprises the combustion of fuel from said fuel tank and means are provided for switching between said operating modes.

9. Motor vehicle as claimed in claim 1, wherein said combustion engine is a Diesel-engine.

10. Motor vehicle as claimed in claim 1, wherein said burner of said auxiliary power unit is a porous burner or a surface radiant burner.

11. Motor vehicle as claimed in claim 2, wherein the portion of said cold-flame product is less than 30% of the entire fuel fed to said combustion engine.

12. Motor vehicle as claimed in claim 4, wherein the portion of said cold-flame product is less than 30% of the entire fuel fed to said combustion engine.

13. Motor vehicle as claimed in claim 1, wherein said combustion engine is a diesel engine, wherein said combustion engine is fed a mixture of fuel from said fuel tank and cold-flame product, and wherein the portion of said cold-flame product is less than 5% of the entire fuel fed to the diesel engine.

14. Motor vehicle as claimed in claim 1, wherein said auxiliary power unit comprises a steam cycle.

15. Motor vehicle as claimed in claim 14, wherein said steam cycle comprises a steam generator which is exposed to heat generated by said burner, and said steam generator is further exposed to said exhaust gas of said combustion engine.

16. Motor vehicle as claimed in claim 1 wherein said auxiliary power unit comprises a Stirling engine.

* * * * *